United States Patent
Keller

(12) United States Patent    (10) Patent No.: US 7,173,712 B2
Keller    (45) Date of Patent: Feb. 6, 2007

(54) METHOD AND DEVICE FOR INCREASING THE LONG-TERM OPERATIONAL RELIABILITY OF A FIBER OPTIC INTERFEROMETER

(75) Inventor: Manfred Keller, Riegel (DE)

(73) Assignee: LITEF GmbH, Freiburg im Breisgau (DE)

( * ) Notice: Subject to any disclaimer, the term of this patent is extended or adjusted under 35 U.S.C. 154(b) by 322 days.

(21) Appl. No.: 10/485,579

(22) PCT Filed: Jul. 26, 2002

(86) PCT No.: PCT/EP02/08345

§ 371 (c)(1),
(2), (4) Date: Feb. 2, 2004

(87) PCT Pub. No.: WO03/014656

PCT Pub. Date: Feb. 20, 2003

(65) Prior Publication Data

US 2004/0233455 A1    Nov. 25, 2004

(30) Foreign Application Priority Data

Aug. 3, 2001    (DE) .............................. 101 38 154

(51) Int. Cl.
*G01C 19/72* (2006.01)

(52) U.S. Cl. ..................................... 356/460

(58) Field of Classification Search ............. 356/460, 356/462, 463, 464, 466, 477, 478, 479, 482, 356/483; 385/12; 250/227.19, 227.27

See application file for complete search history.

(56) References Cited

U.S. PATENT DOCUMENTS

| | | | | |
|---|---|---|---|---|
| 5,137,359 A | * | 8/1992 | Steele | 356/464 |
| 5,412,472 A | | 5/1995 | Okada et al. | |
| 5,469,257 A | * | 11/1995 | Blake et al. | 356/464 |
| 5,563,705 A | | 10/1996 | Sanders | |
| 5,926,275 A | | 7/1999 | Sanders et al. | |
| 6,046,810 A | * | 4/2000 | Sanders et al. | 356/459 |
| 6,351,310 B1 | * | 2/2002 | Emge et al. | 356/460 |
| 6,445,455 B1 | * | 9/2002 | Hall et al. | 356/460 |
| 6,765,678 B2 | * | 7/2004 | Strandjord et al. | 356/460 |

FOREIGN PATENT DOCUMENTS

| | | |
|---|---|---|
| DE | 19808517 | 9/1999 |
| EP | 0386739 | 9/1990 |
| EP | 0802397 | 10/1997 |
| WO | 9904222 | 1/1999 |
| WO | 0173377 | 10/2001 |
| WO | 0206770 | 1/2002 |

* cited by examiner

*Primary Examiner*—Gregory J. Toatley, Jr.
*Assistant Examiner*—Michael A. Lyons
(74) *Attorney, Agent, or Firm*—Elliott N. Kramsky

(57) ABSTRACT

A method for increasing the long-term operational reliability of a fiber optic interferometer. Noise in a detector output signal is set to a desired value by correcting the detector light power. Detector light power is corrected by varying a light source current of a light source of the interferometer. A change in the light source power results. It is thereby possible to increase both the reliability and useful life of the interferometer.

7 Claims, 4 Drawing Sheets

METHOD AND DEVICE FOR INCREASING THE LONG-TERM OPERATIONAL RELIABILITY OF A FIBER OPTIC INTERFEROMETER

BACKGROUND

1. Field of the Invention

The present invention relates to fiber optic interferometers. More particularly, this invention pertains to a method and apparatus for increasing the long-term operational reliability of a fiber optic interferometer.

2. Description of the Prior Art

In known fiber optic systems for optical interferometric measurement of such physical quantities as, e.g., rate of rotation, an electrical voltage or current, the relative phase of two component beams which originate from a common light source and traverse the interferometer is affected by the physical quantity to be measured. The two component beams are brought into interference. The intensity of the interference beam produced is proportional to the phase shift between the two component beams. The interference beam is fed to a photodetector, forming an interference pattern thereon. The detector generates a detector output signal that is proportional to the intensity of the interference pattern, on the basis of which the physical quantity is determined. See, for example WO 99/04222 and DE 198 08 617 A1.

FIG. 4 is a schematic diagram a closed-loop fiber optic interferometer. A brief explanation follows with reference to FIG. 4 of the design and mode of operation of a Sagnac interferometer in a closed loop arrangement for measuring rate of rotation.

Light from a light source 21, such as a superluminescent diode (SLD), stabilized with regard to intensity, passes via a fiber link to a first beamsplitter 22, also denoted as a coupler. From there the light passes via a polarizer 23 to a second, main beamsplitter 24. The component beams produced by beam splitting pass to the two inputs/outputs of a fiber coil 25. A first phase modulator 26 is arranged between the outputs/inputs of the main beamsplitter 24 and those of the fiber coil 25. The component beams interfering in the main beam splitter 24 traverse the polarizer 23 after traversing the fiber coil 25, and are directed (as far as possible, to the extent of a half portion), to a photodetector 27 via the first beamsplitter 22. The output signal from the detector 27 is enhanced by an amplifier 28 and applied to a demodulator 29 and to a synchronous demodulator 30. The demodulator 29, along with an amplifying filter 31, form a scale factor controlled system.

The synchronous demodulator 30 utilizes a filter 32 to drive a ramp generator 33 that serves to generate a reset signal. The signal, generated by a modulation oscillator 34, for shifting the operating point to that of greatest sensitivity, and the reset signal are combined by an adder 35 to form a single signal that is input to a controllable amplifier 36. The amplifier 36 amplifies this signal with the aid of an amplification factor output of the amplifying filter 31. The output thereby obtained from the controllable amplifier 36 serves to drive the first phase modulator 26, which modulates and resets the optical phase correspondingly. It is therefore possible to measure a phase shift that is caused by rotation of the coil 25 (and is experienced by, the oppositely running component beams) due to the Sagnac effect. Moreover, the rate and magnitude rotation can be inferred.

In order to obtain a reliable detector output signal, and thus to permit reliable measurement of the physical quantity, the noise of the detector 27, or the noise in the detector output signal generated by the detector 27, should be as low as possible. Such noise is a function, inter alia, of the signal amplitude of the light beam striking the detector 27. Increasing the detector light power (i.e. increasing the intensity of the light beam striking the detector 27) reduces the noise of the detector output signal as the signal-to-noise ratio is thereby increased. The relationship between detector light power and noise in the detector output signal constitutes a variable characteristic of the detector 27 (or of the operating point of the detector 27) that can be determined by testing or calibration and is a measure of the detectivity of the detector 27.

As mentioned, the intensity of the light beam striking the detector 27 affects the noise in the detector output signal. Light beam intensity at the detector is, for the most part, a function of "path losses" suffered by the light during passage through the interferometer (e.g., in the beamsplitter 22, the polarizer 23 and the fiber coil 25). Light beam intensity is, however, also a function of the optical power (and/or fluctuations in the optical power) of the light source 21. As a result, the aging-induced, inherent decline of the optical light source power has a substantial influence on the noise and, thus, on the long-term reliability of the interferometer 20. Since the decline in light source power is unavoidable, it is known for the light source power to be set disproportionately high to insure sufficient light beam intensity even in the case of declining light source power. However, this has the disadvantage that loading of the light source 21, enlarged unnecessarily, leads to reduction of the useful life of the light source 21.

SUMMARY AND OBJECTS OF THE INVENTION

It is an object of the present invention to provide a method and apparatus for increasing the long-term operational reliability of a fiber optic interferometer.

The invention provides, in a first aspect, a method for increasing the long-term operational reliability of a fiber optic interferometer. Such method includes the step of setting an output signal noise level to a predetermined value by adjusting a detector light power level.

The detector light power level is adjusted by varying a light source current to thereby adjust light source power so that the detector light power remains constant. The light source current is set to the value required to maintain the predetermined noise level upon initialization of the interferometer.

In a second aspect, the invention provides a fiber optic interferometer of the type that includes a control loop for correcting the power of a light source by varying light source current as a function of the light power of a detector.

The control loop of the interferometer includes an auxiliary signal generator connected to the detector for analyzing the detector output signal and for generating an auxiliary signal that is a measure of noise in the detector output signal and the strength of the detector output signal.

A noise controller is connected to the auxiliary signal generator and the light source. The light source current of the light source and the detector light power are changeable by the noise controller as a function of the auxiliary signal and stored calibration values. The light source current is only sufficiently high to maintain a predetermined noise value in the detector output signal upon initiation of the interferometer.

The foregoing features of the invention will be further appreciated from the detailed description that follows. Such description is accompanied by a set of drawing figures. Numerals of the drawing figures, corresponding to those of the written description, point to the features of the invention. Like numerals refer to like features throughout both the written text and the drawings.

DETAILED DESCRIPTION OF THE PREFERRED EMBODIMENT

Figure 1:
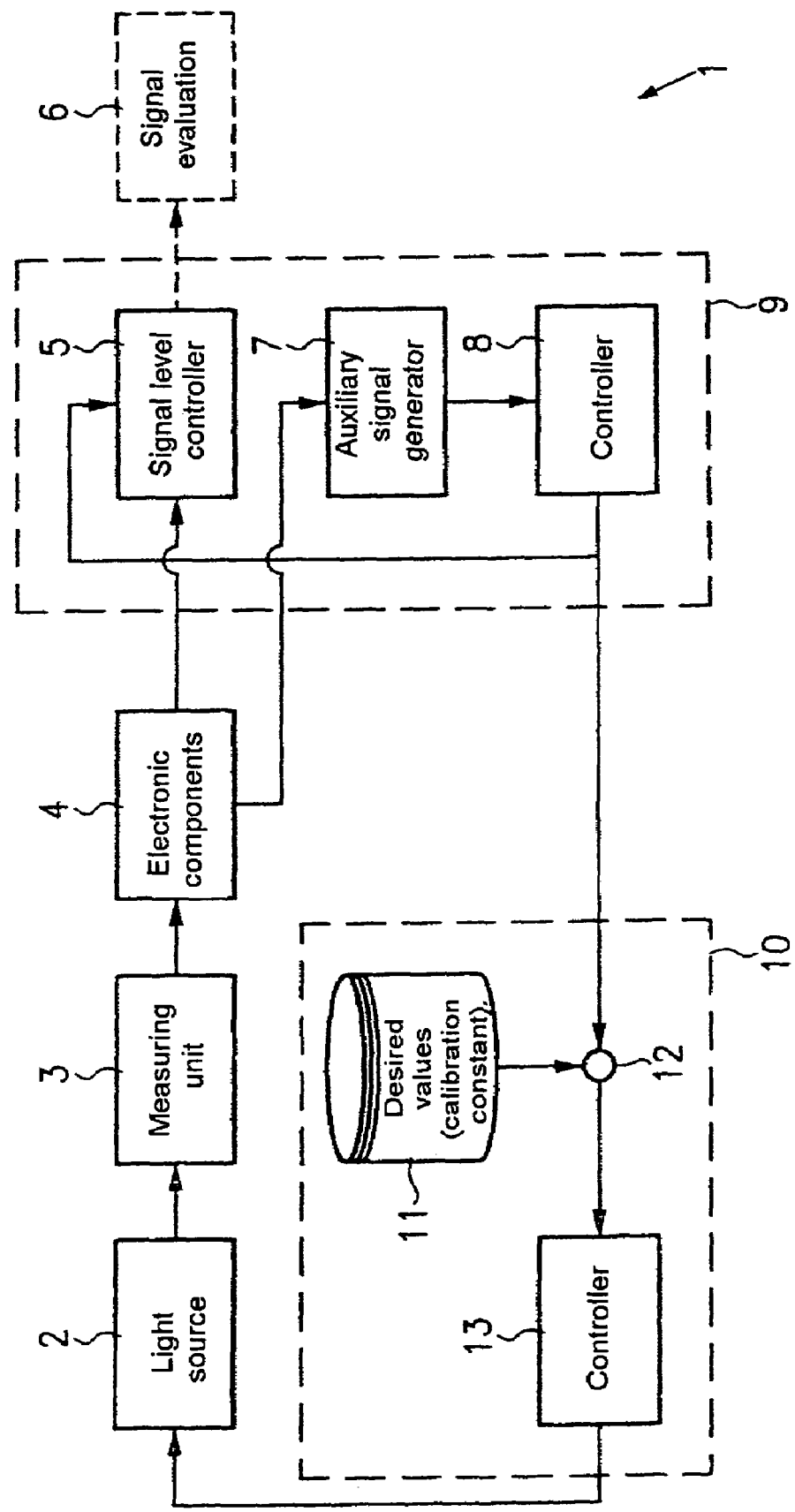
FIG. 1 is a schematic diagram of a portion of a fiber optic interferometer with noise control in accordance with a first embodiment of the invention.
Figure 4:
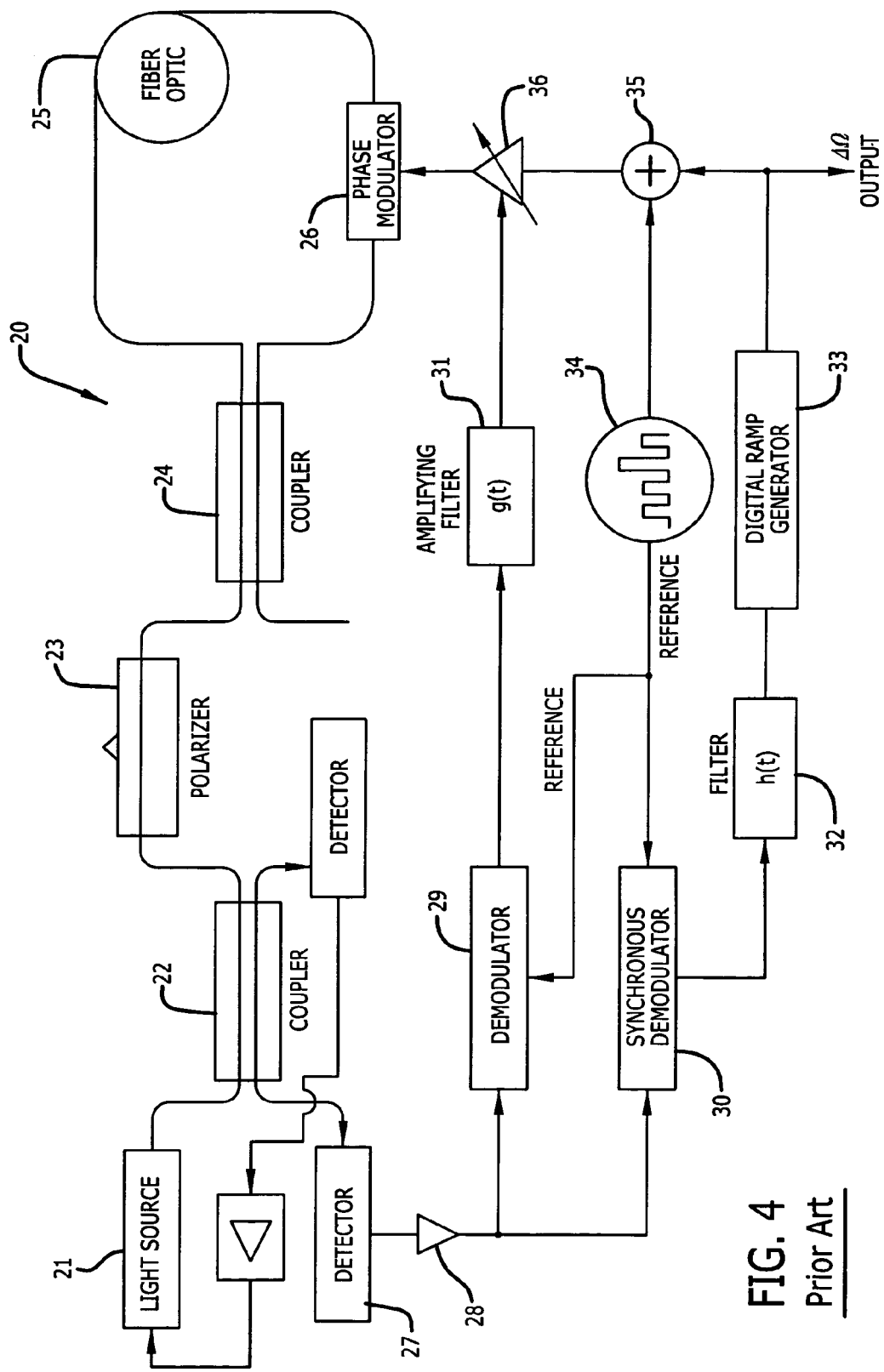
FIG. 4 is a schematic diagram of a closed loop fiber optic interferometer in accordance with the prior art.

FIG. 1 is a schematic diagram of a portion 1 of a fiber optic interferometer with noise control in accordance with a first embodiment of the invention. Light emerging from a light source 2 travels through a measuring unit 3 of the interferometer (i.e., the fiber links and components 22 to 26 as illustrated in FIG. 4). The intensity of the light beam is affected by the physical quantity to be measured, and a measuring beam resulting therefrom is fed to analog or digital electronic components 4 (i.e., the detector 27, 28) for determining measuring beam intensity. A detector output signal (output of electronic components 4) is fed to an auxiliary signal generator 7 and to a signal level controller 5. The auxiliary signal generator 7 analyzes the detector output signal and generates an auxiliary signal that is proportional to its intensity.

The auxiliary signal serves as a manipulated variable for a first controller 8 whose output controls the signal level controller 5 as a function of the auxiliary signal. The signal level controller 5 controls the detector output signal fed to it (from the electronic components 4) so that a constant detector output signal level is achieved. The amplified detector output signal is fed to a signal evaluation 6 (shown in shadow outline).

The signal level controller 5, the auxiliary signal generator 7 and the first controller 8 combine to form an automatic gain control unit 9 (termed AGC controller below). The unit 9 is normally employed in closed loop interferometers. In the invention, the output signal from the first controller 8 is additionally fed to a noise controller 10 (whose output signal, in turn, controls the power or the current of the light source 2 and, thus, the detector light power). The output signal from the first controller 8 is combined for this purpose via an adder stage 12 with a calibration value that is stored in a memory 11. The resulting (addition) signal is fed to a second controller 13. The output of the second controller 13 then controls the light source 2. The noise controller 10 thus comprises the memory 11, the adder stage 12 and the second controller 13.

Since the AGC controller 9 is normally present, noise control can be achieved in accordance with the invention with minimal additional outlay. In particular, additional optical components are not required. The use of an AGC controller ensures rapid availability of interferometer sensor data through its optimized transient response.

Figure 2:
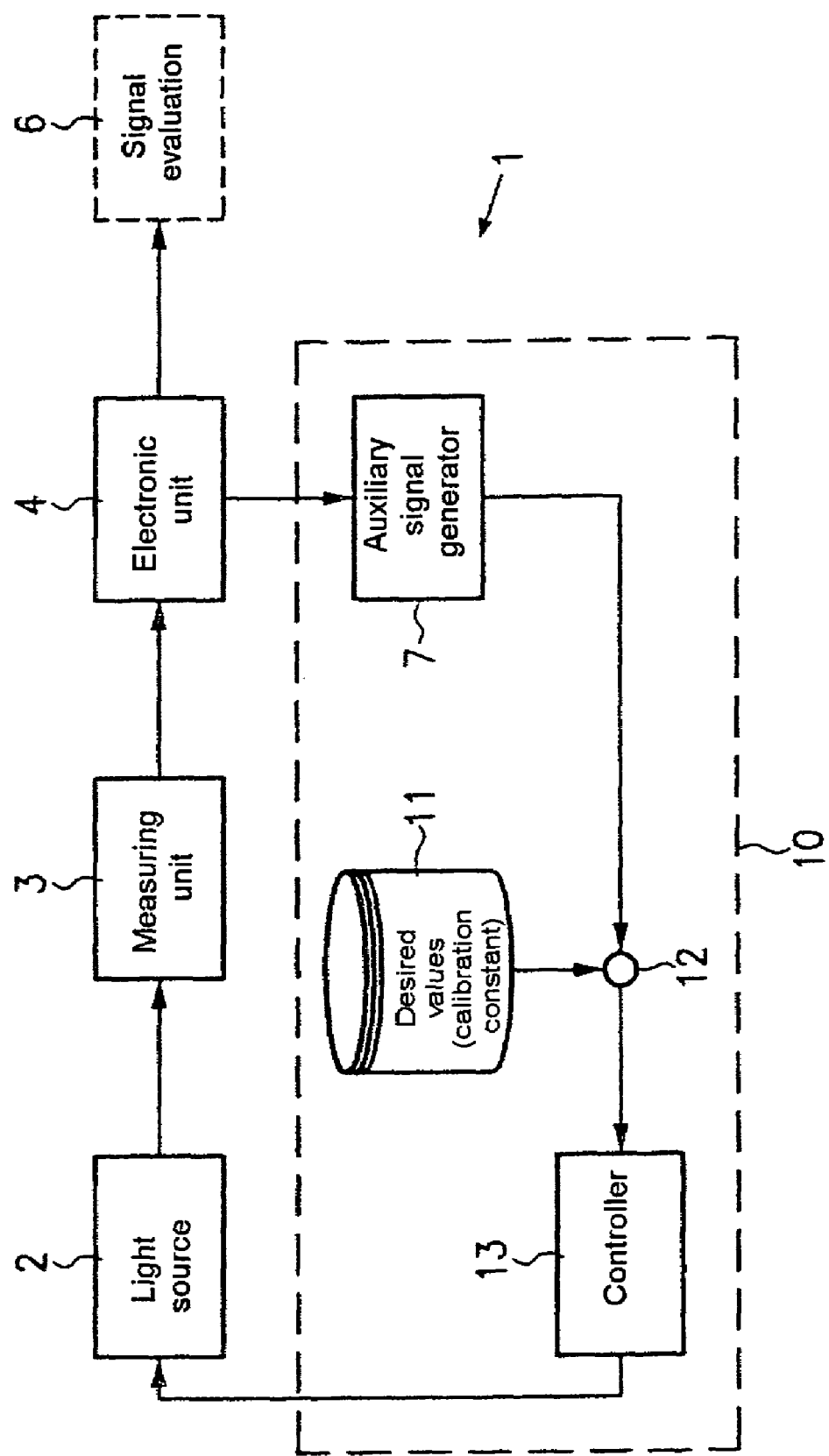
FIG. 2 is a schematic diagram of a portion of a fiber optic interferometer with noise control accordance with a second embodiment of the invention.

FIG. 2 is a schematic diagram of a portion of a fiber optic interferometer in accordance with a second embodiment of the invention. The embodiment shown in FIG. 2 corresponds in design and mode of operation to that of FIG. 1, differing in that the AGC controller 9 is omitted while the auxiliary signal generator 7 is directly integrated into the noise controller 10. The auxiliary signal generated by the auxiliary signal generator 7 is fed directly to the adder stage 12. The two-stage control illustrated in FIG. 1 is thus simplified to a single-stage control.

Figure 3:
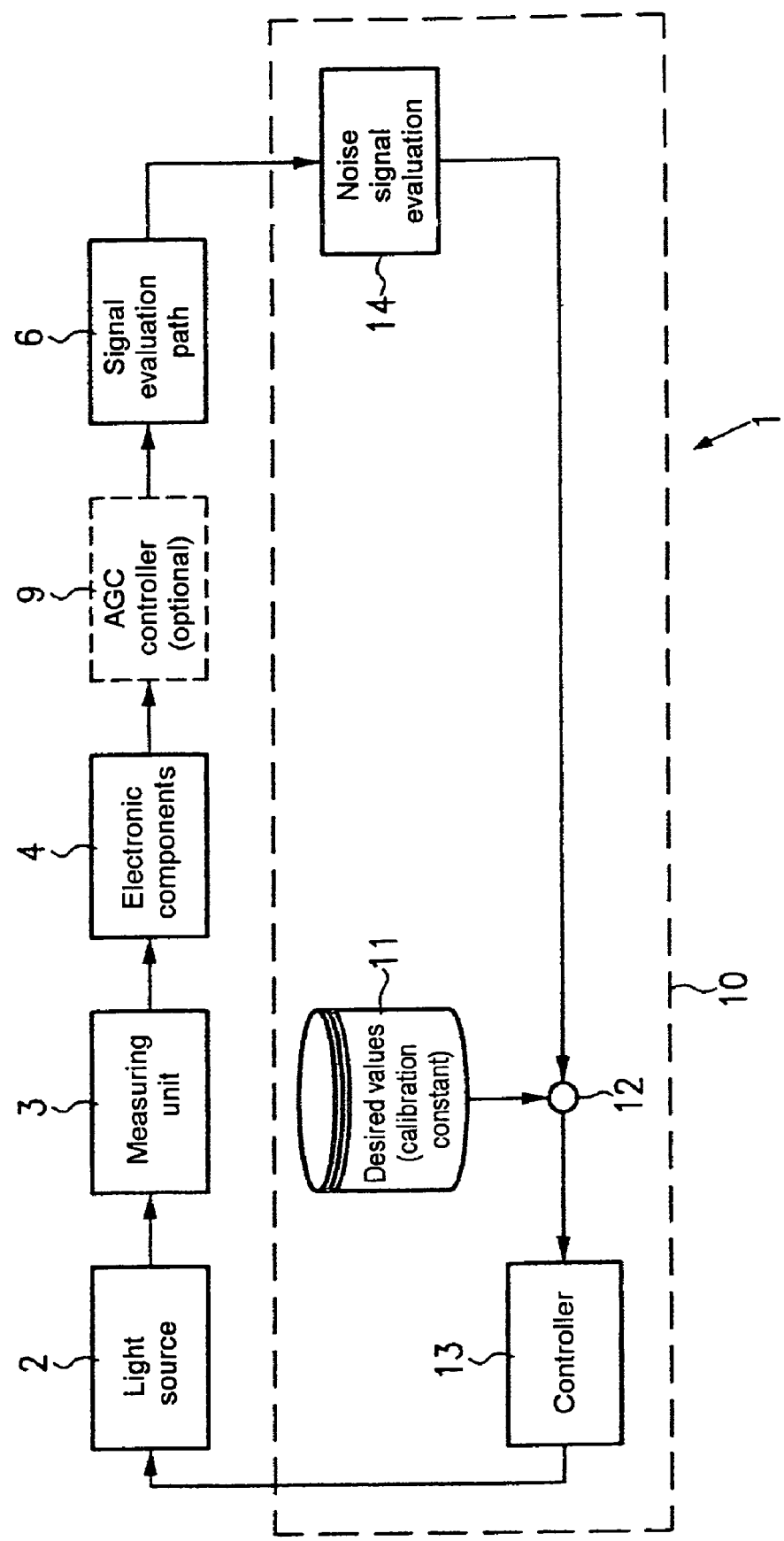
FIG. 3 is a schematic diagram of a portion of a fiber optic interferometer with noise control in accordance with a third embodiment of the invention.

The evaluation of the detector output signal unaffected by the modification shown in FIG. 1 and FIG. 2. By contrast, signal noise is determined directly from the detector output signal or from the already processed detector output signal in the third embodiment shown in FIG. 3. A module 14 for measuring and evaluating the noise component of the detector output signal (termed noise signal evaluation below) generates an output signal that is proportional to the noise and applied to the adder stage 12 and the second controller 13. The noise signal evaluation 14 corresponds to the auxiliary signal generator 7. The use of an AGC controller 9 is optional as noise control can be performed in two stages as in FIG. 1, or in one stage as in FIG. 2. It is possible during a correspondingly slow control to use time-consuming algorithms to separate the noise from the actual measuring signal.

The desired or calibration values stored in the memory 11 are specific to the unit and can be determined by testing. It is thus possible for any interferometer of the type discussed herein to be configured individually to a desired noise level.

Influences on the wavelength of the emitted light by variation of the light source current can be compensated by correction algorithms employing the parameters of light source current and temperature. Operational reliability and surge-proofness (in the event of faults in the optical domain) can be insured by the presence of suitable limiters both in the second controller 13 and in the current control for the light source 2.

An essential aspect of the invention is that the noise of the detector output signal is set to a desired value by correcting the detector light power by varying the light source power via a control loop. The light source power is thus set as a function of the detector light power. That is, the interferometer is noise-controlled. This permits a desired detector light power and, thus, a desired noise level in the detector output signal, to be set in conjunction with optimized light source power, as the light source power is increased or lowered in a targeted manner only when the detector light power has "worsened" or "improved". Loading of the light source can thereby be reduced, leading to a lengthened useful life of the light source. The variation of light source power is performed in this case by varying light source current.

Light source power is preferably varied such that the detector light power and, thus, the noise of the detector output signal, are constant. This enables further evaluation of the detector output signal to be simplified. The ratio, required as calibration value for noise control, between the detector light power and noise in the detector output signal can be determined in this case by calibration processes or by tests.

The detector light power and the detector noise correlated therewith are determined from the intensity of the detector output signal, or by direct calculation of the noise in the detector output signal by means of software or ASIC hardware. For example, if the intensity of the detector output signal has reduced, or the noise in the detector output signal has increased, the light source power is increased via a control loop with the aid of desired values or calibration constants until the detector light power and, thus, the noise reach the desired value again. The light source power is thereby corrected as a function of the detector output signal.

In a particularly preferred embodiment, the control loop has an auxiliary signal generator, connected to the detector for analyzing the detector output signal and for generating an auxiliary signal. The auxiliary signal is either a measure of the noise in the detector output signal or a measure of the strength of the detector output signal. Furthermore, the control loop has a noise controller which is connected to the auxiliary signal generator and the light source and by means of which a light source current of the light source, and thus the detector light power, can be changed as a function of the auxiliary signal and stored calibration values.

The auxiliary signal generator can be configured as a part of an automatic gain control (AGC) controller for compensating fluctuations in the detector output signal on the basis of light power fluctuations at the detector. The auxiliary signal generator in this embodiment generates an auxiliary signal that is proportional to the strength of the detector output signal and serves to control a signal level controller, included in the AGC controller, for compensating the fluctuations in the detector output signal and, in addition, for controlling the noise controller. Since, in most cases, in particular in the case of closed loop interferometers, an AGC controller, and, thus, an auxiliary signal generator, are already present, all that is required is to add the noise controller to the interferometer which changes the light source power as a function of the auxiliary signal and stored calibration values. No substantial changes therefore are to be undertaken at the interferometer, use being made of existing structures.

The AGC controller and the noise controller are preferably decoupled from one another by different time constants. The AGC controller, as subordinate auxiliary controller in this case, compensates short-term light power fluctuations at the detector, while long-term light power fluctuations are compensated by the noise controller. The mode of operation can also be reversed by selecting appropriate time constants.

In a further embodiment, the auxiliary signal generator is configured such that it can be used to determine directly the noise in the detector output signal via suitable algorithms, and to generate a corresponding noise signal as auxiliary signal. The noise signal then serves as manipulated variable for the noise controller.

The use of a control loop for setting the noise has the advantage, furthermore, that it is possible thereby for the state of aging of the interferometer, in particular the state of aging of the light source, to be read out from the actual value of the light source power: if the difference between an output light source power required for a permissible noise level in the detector output signal (or the light source current required therefore) upon starting up the interferometer and an actual light source power required for the same noise level is determined, it is possible therefrom to infer a state of aging of the interferometer.

A further advantage of the invention is the compensation of optical transmission fluctuations by the control loop. Furthermore, light sources with relatively strongly polarized light can be employed. Temperature dependencies of the interferometer and polarization-induced light power losses (power fading) are significant causes of the transmission fluctuations. In order to compensate them, it is customary to compensate light source power by the factor k=(1+error) but, as already mentioned, this has negative effects on the useful life of the light source. Moreover, it leads to tighter tolerance criteria (higher production costs) for optical components of the interferometer. The use of cost-effective designs in conjunction with the same performance features is made possible by use of the inventive control loop, as transmission fluctuations in the light are compensated.

Furthermore, noise correction eliminates any need for the light source power to be outside the statistical early failure region after sensor burn-in.

While the invention has been disclosed with reference to its presently-preferred embodiments, it is not limited thereto. Rather, this invention is limited only insofar as it is defined by the following set of patent claims and includes within its scope all equivalents thereof.

What is claimed is:

1. A method for increasing the long-term operational reliability of a fiber optic interferometer comprising the steps of:
   a) determining a target output signal noise level of a detector output signal, which should remain constant throughout a lifetime of the interferometer;
   b) determining an initial light source current, which during an initialization of said interferometer is required to maintain said target output signal noise level;
   c) applying the initial light source current after the initialization during operation of the interferometer;
   d) measuring the output signal noise level during operation of said interferometer;
   e) adjusting said measured output signal noise level to the target output signal noise level by varying the light source current to thereby adjust light source power so that the output signal noise level remains substantially constant.

2. A method as defined in claim 1 further including the step of inferring a state of aging of the interferometer light source by comparing the initial light source current for achieving the target output signal noise level in the detector output signal with an actual light source current for achieving the same noise level.

3. A method as defined in claim 1 further including the steps of:
   a) determining the strength of the detector output signal as a measure of the output signal noise level; and
   b) varying the light source current on the basis thereof.

4. A method as defined in claim 1 further including the steps of:
   a) determining the noise in the detector output signal; and
   b) varying the light source current on the basis of said determination.

5. A fiber optic interferometer of the type that includes a control loop for correcting the power of a light source by varying light source current as a function of the light power of a detector characterized in that said control loop comprises, in combination:
   a) an auxiliary signal generator connected to said detector for analyzing the detector output signal and for generating an auxiliary signal that is a measure of noise in the detector output signal; and b) a noise controller connected to said auxiliary signal generator and to said light source; c) whereby the noise controller comprises a memory to store as calibration data at least a target output signal noise level, which should be maintained throughout the lifetime of the interferometer and an initial light source current, which is only sufficiently high to maintain said target output signal noise level upon initialization of the interferometer; and
   d) the source current of the light source is changeable by said noise controller as a function of the auxiliary signal and the stored calibration values.

6. A fiber optic interferometer as defined in claim 5 characterized in that:

a) said control loop including an AGC controller for compensating fluctuations in said detector output signal in response to light power fluctuations at said detector;
b) said auxiliary signal generator being part of said AGC controller;
c) said auxiliary signal generated by said auxiliary signal generator being proportional to the strength of said detector output signal;
d) said auxiliary signal controlling a signal level controller being a part of said AGC controller for controlling said detector output signal and said noise controller.

7. A fiber optic interferometer as defined in claim 6, wherein said AGC controller and said noise controller are decoupled from one another by different time constants.

* * * * *